US006221936B1

(12) United States Patent
Bryson et al.

(10) Patent No.: US 6,221,936 B1
(45) Date of Patent: *Apr. 24, 2001

(54) TIRE TREAD RUBBER CONTAINING UINTAHITE

(75) Inventors: Jay Gordon Bryson; Neil Arthur Maly, both of Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/416,178

(22) Filed: Oct. 11, 1999

Related U.S. Application Data

(63) Continuation-in-part of application No. 09/038,264, filed on Mar. 10, 1998, now Pat. No. 6,011,093.

(51) Int. Cl.⁷ .............................. C08L 95/00; B60C 11/00; B60C 9/00
(52) U.S. Cl. .................. 524/62; 152/209.1; 152/525; 152/547; 152/564
(58) Field of Search ...................... 524/62; 152/209.1, 152/525, 547, 564

(56) References Cited

U.S. PATENT DOCUMENTS 6,011,093 * 1/2000 Maly et al. ........................ 524/62

* cited by examiner

*Primary Examiner*—James J. Seidleck
*Assistant Examiner*—Olga Asinovsky

(57) ABSTRACT

This invention is based upon the unexpected discovery that uintahite can be incorporated into tire component rubber to improve the physical properties thereof. For example, by incorporating uintahite into tire tread rubber compositions, tires with improved tear and puncture resistance can be manufactured. Since uintahite is a relatively low cost material, its incorporation into tires also reduces cost. For instance, uintahite can be incorporated into a wide variety of tire rubber compounds used in the tread (including the base and the cap), sidewall, apex, chafer, bead coat, toeguard, innerliner, ply coat, gum strips, coverstrip, overlay and wedge stocks. This invention more specifically discloses a pneumatic tire which is comprised of a generally toroidal-shaped carcass, an outer circumferential tread which is adapted to be ground contacting, two spaced beads and two sidewalls extending radially from said spaced beads and connecting said tread to said spaced beads, wherein said tread is comprised of at least one rubbery polymer and from about 1 phr to about 20 phr of uintahite.

61 Claims, No Drawings

TIRE TREAD RUBBER CONTAINING UINTAHITE

This is a continuation-in-part application of U.S. Pat. application Ser. No. 09/038,264, filed on Mar. 10, 1998 U.S. Pat. No. 6,011,093.

FIELD OF THE INVENTION

This invention relates generally to rubber treads for pneumatic vehicle tires. It relates more specifically to a pneumatic tire with a tread composed of at least one sulfur-cured rubbery polymer and from about 1 phr to about 20 phr of uintahite.

BACKGROUND OF THE INVENTION

A pneumatic tire is a polymeric composite and is a complex system of interacting components, each with specific properties for maximum effectiveness. One of the more important components of a tire is the tread. Since the tread of a tire comes into contact with the road, it is particularly compounded for good traction, good wear characteristics and low rolling resistance. To achieve this combination of properties, blends of various rubbers and other materials (such as fillers, resins, oils and antioxidants) are conventionally used in compounding the tread rubber. The tread of an automobile passenger tire is generally composed of a blend of styrene-butadiene rubber and cis-1,4-polybutadiene rubber. The tread of automobile passenger tires can also contain a wide variety of other rubbery polymers, such as medium vinyl-1,2-polybutadiene rubber, high vinyl-1,2-polybutadiene rubber, 3,4-polyisoprene rubber, isoprene-butadiene rubber, styrene-isoprene rubber and styrene-isoprene-butadiene rubber. Treads for truck and aircraft tires are normally composed of natural rubber or synthetic polyisoprene rubber in blends with synthetic elastomers, such as styrene-butadiene rubber and polybutadiene rubber. However, tread rubbers used in truck and aircraft tires can also contain a wide variety of other rubbery polymers.

It is also important for many tires to exhibit good tear and puncture resistance. This is, of course, because the tire can come into contact with sharp objects and should be capable of resisting puncture or tear. For instance, farm tractor tires frequently run over sharp corn stalks and rocks with sharp edges and should be highly resistant to being punctured by such objects. Earthmover tires also encounter a wide variety of sharp objects at construction sites and must exhibit a high level of resistance to being punctured or torn. Off-the-road tires for trucks and four-wheel-drive vehicles also need to have treads that are highly resistant to tears and punctures.

SUMMARY OF THE INVENTION

This invention is based upon the unexpected discovery that uintahite can be incorporated into tire tread rubber to improve the physical properties thereof. By incorporating uintahite into tire tread rubber compositions, tires with improved tear and puncture resistance can be manufactured. Since uintahite is a relatively low cost material, its incorporation into tires also reduces cost. This is especially true in cases where uintahite is used to replace much more expensive materials, such as gum rosin. Cost reduction is also, of course, realized by simply adding the inexpensive uintahite to standard tire rubber formulations.

This invention more specifically discloses a pneumatic tire which is comprised of a generally toroidal-shaped carcass, an outer circumferential tread which is adapted to be ground contacting, two spaced beads and two sidewalls extending radially from said spaced beads and connecting said tread to said spaced beads, wherein said tread is comprised of at least one rubbery polymer and from about 1 phr to about 20 phr of uintahite. Such a pneumatic tire that has a uintahite containing tread exhibits improved resistance to tears and punctures.

The subject invention further discloses a pneumatic tire having an outer circumferential tread wherein said tread is a sulfur-cured rubber composition which is comprised of at least one rubbery polymer and from about 1 to about 20 phr of uintahite. The sulfur-cured rubber composition will typically be one or more polydiene rubbers; such as, natural rubber, synthetic polyisoprene rubber, styrene-butadiene rubber, cis-1,4-polybutadiene rubber, medium vinyl-1,2-polybutadiene rubber, high vinyl-1,2-polybutadiene rubber, 3,4-polyisoprene rubber, isoprene-butadiene rubber, styrene-isoprene rubber or styrene-isoprene-butadiene rubber.

The present invention also reveals a sulfur-cured tire rubber composition which is comprised of at least one rubbery polymer and from about 1 phr to about 20 phr of uintahite. Sulfur-cured rubber compositions of this type will normally be employed as tire tread compounds. They can additionally be used in tire sidewall, apex, chafer, bead coat, toeguard, innerliner, ply coat, gum strip, coverstrip, overlay or wedge stock compounds.

The sulfur-cured tire rubber compositions of this invention typically do not contain any crosslinked fatty acids or any starch. In other words, the sulfur-cured tire rubber compositions of this invention are typically void of crosslinked fatty acids and also typically void of starch. Thus, the present invention further reveals a sulfur-cured tire rubber composition which is comprised of at least one rubbery polymer and from about 1 phr to about 20 phr of uintahite, wherein the sulfur-cured tire rubber composition is free of crosslinked fatty acids. The subject invention also discloses a sulfur-cured tire rubber composition which is comprised of at least one rubbery polymer and from about 1 phr to about 20 phr of uintahite, wherein the sulfur-cured tire rubber composition is free of starch.

DETAILED DESCRIPTION OF THE INVENTION

In accordance with this invention, a pneumatic tire is provided having an outer circumferential tread where said tread is a sulfur-cured rubber composition which is comprised of at least one rubbery polymer and about 1 phr (parts by weight per 100 parts by weight of rubber) to about 20 phr of uintahite. The rubbery polymer will typically be a blend of two or more polydiene rubbers; such as, natural rubber, synthetic polyisoprene rubber, styrene-butadiene rubber, cis-1,4-polybutadiene rubber, medium vinyl-1,2-polybutadiene rubber, high vinyl-1,2-polybutadiene rubber, 3,4-polyisoprene rubber, isoprene-butadiene rubber, styrene-isoprene rubber or styrene-isoprene-butadiene rubber.

Typically from about 2 phr to about 15 phr of uintahite will be included in the blend with it being preferred for 3 phr to 10 phr of uintahite to be present in the polymeric blend. It is normally most preferred for the tread rubber composition to contain from about 4 phr to about 6 phr of uintahite.

Uintahite is a naturally occurring hydrocarbon substance that looks like coal except for having a more glossy surface and being very brittle. Uintahite contains virtually no polynuclear aromatic hydrocarbons and is sometimes called uintaite. It is mined in the Uinta (or Uintah) Basin of Utah from vertical veins extending downward from the surface to a depth of as much as 600 meters. Uintahite is an asphaltite which means that it is a solid which is soluble in carbon disulfide and which is difficult to fuse. Uintahite has a ring and ball softening point of greater than about 125° C. and typically has a ring and ball softening point which is within the range of about 130° C. to about 205° C. The uintahite used in the tire tread compounds of this invention will preferably have a ring and ball softening point which is within the range of about 150° C. to about 190° C. Chemical analysis shows that uintahite contains about 85 weight percent carbon, about 10 weight percent hydrogen, about 2.5 weight percent nitrogen, about 1.5 weight percent oxygen, about 0.3 weight percent sulfur, about 0.2 weight percent silicon, nickel and trace elements, and a trace of solid paraffins (unsulfonated residue). Virgin uintahite is mined and simply ground into powder form. Virgin uintalhite is sold by American Gilsonite Corporation as a powder under the tradename "Gilsonite®." It is also sold by Ziegler Chemical & Mineral Corporation and by Lexco Corporation. Hydrocarbon solvent extracted uintahite is also commercially available from American Gilsonite Corporation. It is made by extracting the heptane soluble components from virgin uintahite.

Virgin uintahite powder can be simply blended into the tread rubber compounds of this invention using conventional mixing procedures. Typically, the uintahite powder will be mixed into the rubber blend in a Banbury mixer or on a mill mixer. This will typically be done when the various rubbers in the blend are being mixed together. In any case, any mixing technique that results in a relatively homogeneous blend of the uintahite throughout the tread rubber compound can be used.

The tire tread rubber containing the uintahite can then be employed in building tires using standard tire building techniques. Such pneumatic tires are conventionally comprised of a generally toroidal-shaped carcass with an outer circumferential tread, adapted to be ground contacting, spaced beads and sidewalls extending radially from and connecting said tread to said beads. The carcass will normally be a fabric-reinforced carcass.

It should readily be understood by one having skill in the art that said tread portion of the pneumatic tire as well as the rubber or other material in the basic carcass, which normally contains reinforcing elements in the tread region, can be compounded by methods generally known in the rubber compounding art, such as mixing the various sulfur-vulcanizable constituent rubbers with various commonly used additive materials such as, for example, curing aids, such as sulfur, activators, retarders and accelerators, prevulcanization inhibitors, processing additives, such as oils, resins including tackifying resins, silicas and plasticizers, fillers, pigments, stearic acid, zinc oxide, waxes, antioxidants and antiozonants, peptizing agents and reinforcing materials such as, for example, carbon black. As known to those skilled in the art, depending on the intended use of the sulfur-vulcanizable and sulfur-vulcanized material (rubbers), the certain additives mentioned above are selected and commonly used in conventional amounts.

Typical amounts of carbon black will be within the range of about 20 phr to 100 phr, preferably about 45 to about 85 phr, and most preferably about 30 phr to about 60 phr. Carbon blacks that are normally used include N-220, N-330, N-347, N-110, N-300, N-550, N-234 and N-339. Typical amounts of tackifier resins, if used, comprise about 0.5 phr to about 10 phr. Typical amounts of processing aids comprise about 1 phr to about 5 phr. Typical amounts of silica, if used, comprise about 5 phr to about 25 phr and amounts of silica coupler, if used, comprise about 0.05 to about 0.25 parts per part of silica by weight. Representative silicas may be, for example, hydrated amorphous silicas. A representative coupling agent may be, for example, a bifunctional sulfur containing organo silane such as, for example, bis-(3-triethoxy-silylpropyl) tetrasulfide, bis-(3-trimethoxy-silylpropyl)tetrasulfide and bis (3-trimethoxy-silylpropyl) tetrasulfide grafted silica from DeGussa, AG. Typical amounts of antioxidants comprise about 1 phr to about 5 phr. Representative antioxidants may be, for example, diphenyl-p-phenylenediamine and others, such as those disclosed in the *Vanderbilt Rubber Handbook* (1978), pages 344–346. Suitable antiozonant(s) and waxes, particularly microcrystalline waxes, may be of the type shown in the *Vanderbilt Rubber Handbook* (1978), pages 346–347. Typical amounts of antiozonants comprise about 1 phr to about 5 phr. Typical amounts of stearic acid comprise about 1 phr to about 3 phr. Typical amounts of zinc oxide comprise about 2 phr to about 5 phr. Typical amounts of waxes comprise about 1 phr to about 5 phr. Typical amounts of peptizers comprise about 0.1 phr to about 1 phr.

The sulfur-cured tire rubber compounds of this invention do not normally contain any crosslinked fatty acids and normally do not contain any starch. In other words, the sulfur-cured tire rubber compounds of this invention are typically void of crosslinked fatty acids, such as vegetable oil fatty acids which are crosslinked with a peroxide (crosslinked soya fatty acid). The sulfur-cured tire rubber compounds of this invention are also normally void of starch, such as unmodified corn starch.

The vulcanization is conducted in the presence of a sulfur vulcanizing agent. Examples of suitable sulfur vulcanizing agents include elemental sulfur (free sulfur) or sulfur donating vulcanizing agents; for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 phr to about 8 phr with a range of from about 1.5 phr to about 2.25 phr being preferred.

Accelerators are used to control the time and/or temperature required for vulcanization and to improve the properties of the vulcanizate. In one embodiment, a single accelerator system may be used; i.e., primary accelerator. Conventionally, a primary accelerator is used in amounts ranging from about 0.5 phr to about 2.0 phr. In another embodiment, a combination of two or more accelerators is used with one accelerator being employed in a relatively large amount (about 0.5 phr to about 1.0 phr) and with a secondary accelerator being employed in a relatively small amount (about 0.05 phr to about 0.50 phr) in order to activate and to improve the properties of the vulcanizate. Combinations of such accelerators have historically been known to produce a synergistic effect of the final properties of sulfur-cured rubbers and are often somewhat better than those produced by use of either accelerator alone. In addition, delayed action accelerators may be used which are less affected by normal processing temperatures but produce satisfactory cures at ordinary vulcanization temperatures. Representative examples of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The tire can be built, shaped, molded and cured by various methods which will be readily apparent to those having skill in the art. In the practice of this invention, the tread rubber composition can be integral with and adhered to various tire carcass substrate rubber compositions. Typically, such a rubber composition will contain at least one polydiene rubber. However, in most cases, it will be a blend of at least two polydiene rubbers, such as high cis-1,4-polybutadiene and styrene-butadiene rubber. Optionally, such a blend for a portion of the tread, particularly where the tread is in the region of the sidewall area of the tire, may contain one or more of butyl rubbers or halobutyl rubbers, such as chlorobutyl or bromobutyl rubber, and ethylene/propylene/conjugated diene terpolymer rubber, polyisoprene and polybutadiene rubber.

In the further practice of this invention, the tread can typically be applied in the building of the green tire in which the uncured, shaped tread is built onto the carcass following which the green tire is shaped and cured. Alternately, the tread can be applied to a cured tire carcass from which the previous tread has been buffed or abraded away and the tread cured thereon as a retread.

The practice of this invention is further illustrated by reference to the following examples which are intended to be representative rather than restrictive of the scope of the invention. Unless otherwise indicated, all parts and percentages are by weight.

EXAMPLE 1–4

In this series of experiments, several uintahite containing tread rubber compositions were made and compared with a control. In this series of experiments, nonproductive rubber blends were made by mixing 85 parts of an emulsion styrene-butadiene rubber (containing 23.5 percent bound styrene), 15 parts of Budene® 1207 high cis-1,4-polybutadiene rubber, 4.5 parts of wax, 20 parts of processing oil, 2.0 parts of stearic acid, 3.5 antidegradant, 5.0 parts of ground cured rubber, 61.0 parts of carbon black and 5 parts of uintahite or Chinese gum rosin. Gilsonite® 300 uintahite (softening point of 146° C.) was used in Example 1, Gilsonite® 350 uintahite (softening point of 176° C.) was used in Example 2, Gilsonite® 375 uintahite (softening point of 189° C.) was used in Example 3 and Chinese gum rosin was used in Comparative Example 4.

Productive rubber compounds were then made by mixing 1.1 parts of benzothiazyl disulfide, 1.1 parts of N-t-butyl-2-benzothiazylsulfenamide, 1.15 parts of additional antioxidant, 3.0 parts of zinc oxide and 1.5 parts of sulfur into each of the nonproductive rubber blends. The rubber blends were then cured and evaluated to determine physical properties. The results of this evaluation are shown in Table I.

TABLE I

| Example | 1 | 2 | 3 | 4 |
|---|---|---|---|---|
| Delta Torque | 29.4 | 29.1 | 29.6 | 25.1 |
| Tensile Mod (MPa) | 15.0 | 14.8 | 14.5 | 14.9 |
| Elongation (%) | 566 | 579 | 551 | 652 |
| 100% Modulus (MPa) | 1.8 | 1.8 | 1.8 | 1.6 |
| 200% Modulus (MPa) | 4.0 | 3.9 | 4.0 | 3.3 |
| 300% Modulus (MPa) | 7.4 | 7.2 | 7.4 | 6.0 |
| Shore A Hardness | | | | |
| @ RT | 63.6 | 63.7 | 63.0 | 61.6 |
| @ 100° C. | 51.0 | 51.7 | 51.4 | 48.1 |
| Penetration Energy | | | | |
| @ 0–5 mm | 0.108 | 0.118 | 0.107 | 0.103 |
| @ 0–10 mm | 0.703 | 0.734 | 0.703 | 0.652 |

TABLE I-continued

| Example | 1 | 2 | 3 | 4 |
|---|---|---|---|---|
| @ 0–15 mm | 1.90 | 1.95 | 1.90 | 1.74 |
| @ 0–20 mm | 3.73 | 3.81 | 3.72 | 3.46 |

As can be seen from Table I, the blend made with the uintahite (Example 5) exhibited higher penetration energy than did the control (Example 4) made utilizing Chinese gum rosin. This means that tire treads made with uintahite will have better puncture resistance than treads made using Chinese gum rosin. The increased delta torque and modulus observed at 100 percent, 200 percent and 300 percent are indicative of the blends made with the uintahite being in an increased state of cure. This is probably due to the elimination of the Chinese gum rosin which tends to retard cure. In any case, the amount of curatives can be reduced by about 5 percent in cases where uintahite is used as a replacement for Chinese gum rosin.

Multiple benefits are attained in cases where uintahite is substituted in tire tread compounds for Chinese gum rosin. These benefits include: (1) lower cost, (2) better puncture resistance and (3) lower curative requirements. Thus, better tires can be manufactured at a reduced cost by including uintahite in the tread rubber compound.

EXAMPLES 5–6

In this experiment, a uintahite containing tread rubber composition was made and compared with a control. In Example 5, a nonproductive rubber blend containing uintahite was made by mixing 85 parts of an emulsion styrene-butadiene rubber (containing 23.5 percent bound styrene), 15 parts of Budene® 1207 high cis-1,4-polybutadiene rubber, 4.5 parts of wax, 20 parts of processing oil, 2.0 parts of stearic acid, 3.5 antidegradant, 5.0 parts of ground cured rubber, 61.0 parts of carbon black, 5 parts of Chinese gum rosin and 10 parts of Gilsonite® 350 uintahite (softening point of 176° C.). In the control (Comparative Example 6), uintahite was not included in the nonproductive rubber compound.

Productive rubber compounds were then made by mixing 1.1 parts of benzothiazyl disulfide, 1.1 parts of N-t-butyl-2-benzothiazylsulfenamide, 1.15 parts of additional antioxidant, 3.0 parts of zinc oxide and 1.5 parts of sulfur into each of the nonproductive rubber blends. The rubber blends were then cured and evaluated to determine physical properties. The results of this evaluation are shown in Table II.

TABLE II

| Example | 5 | 6 |
|---|---|---|
| Delta Torque | 21.8 | 24.0 |
| Tensile Modulus (MPa) | 11.8 | 13.8 |
| Elongation (%) | 757 | 596 |
| 100% Modulus (MPa) | 1.5 | 1.7 |
| 200% Modulus (MPa) | 2.6 | 3.6 |
| 300% Modulus (MPa) | 4.3 | 6.5 |
| Shore A Hardness | | |
| @ RT | 63.8 | 62.3 |
| @ 100° C. | 45.8 | 47.9 |
| Mooney Viscosity (ML1 + 4) | 47.9 | 45.7 |

TABLE II-continued

| Example | 5 | 6 |
| --- | --- | --- |
| Penetration Energy | | |
| @ 0–5 mm | 0.125 | 0.103 |
| @ 0–10 mm | 0.770 | 0.658 |
| @ 0–15 mm | 1.99 | 1.78 |
| @ 0–20 mm | 3.86 | 3.54 |

As can be seen from Table II, the blend made with the uintahite exhibited increased elongation and increased penetration energy while essentially maintaining Mooney viscosity and hardness. This shows that the puncture resistance of tire treads can be improved by simply adding uintahite to conventional tread rubber compounds. This experiment again shows that tires having improved puncture resistance can be manufactured at a reduced cost by including uintahite in the tread rubber formulation.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A sulfur-cured tire rubber composition which is comprised of at least one rubbery polymer and from about 1 phr to about 20 phr of uintahite, wherein the sulfur-cured tire rubber composition is free of crosslinked fatty acids.

2. A sulfur-cured tire rubber composition as specified in claim 1 wherein the uintahite is virgin uintahite.

3. A sulfur-cured tire rubber composition as specified in claim 2 wherein the rubbery polymer is one or more polydiene rubbers.

4. A sulfur-cured tire rubber composition as specified in claim 3 wherein the uintahite is present at a level which is within the range of about 2 phr to about 15 phr.

5. A sulfur-cured tire rubber composition as specified in claim 3 wherein the uintahite is present at a level which is within the range of about 3 phr to about 10 phr.

6. A sulfur-cured tire rubber composition as specified in claim 3 wherein the uintahite is present at a level which is within the range of about 4 phr to about 6 phr.

7. A sulfur-cured tire rubber composition as specified in claim 1 wherein the uintahite is hydrocarbon solvent extracted uintahite.

8. A sulfur-cured tire rubber composition as specified in claim 7 wherein the rubbery polymer is one or more polydiene rubbers.

9. A sulfur-cured tire rubber composition as specified in claim 3 wherein the uintahite is present at a level which is within the range of about 2 phr to about 15 phr.

10. A sulfur-cured tire rubber composition as specified in claim 5 wherein polybutadiene rubber and styrene-butadiene rubber are present as polydiene rubbers.

11. A sulfur-cured tire rubber composition as specified in claim 1 wherein said sulfur-cured tire rubber composition is in the form of a sidewall.

12. A sulfur-cured tire rubber composition as specified in claim 1 wherein said sulfur-cured tire rubber composition is in the form of an apex.

13. A sulfur-cured tire rubber composition as specified in claim 1 wherein said sulfur-cured tire rubber composition is in the form of a chafer.

14. A sulfur-cured tire rubber composition as specified in claim 1 wherein said sulfur-cured tire rubber composition is in the form of a bead coat.

15. A sulfur-cured tire rubber composition as specified in claim 1 wherein said sulfur-cured tire rubber composition is in the form of a toeguard.

16. A sulfur-cured tire rubber composition as specified in claim 1 wherein said sulfur-cured tire rubber composition is in the form of an innerliner.

17. A sulfur-cured tire rubber composition as specified in claim 1 wherein said sulfur-cured tire rubber composition is in the form of a ply coat.

18. A sulfur-cured tire rubber composition as specified in claim 1 wherein said sulfur-cured tire rubber composition is in the form of a gum strip.

19. A sulfur-cured tire rubber composition as specified in claim 1 wherein said sulfur-cured tire rubber composition is in the form of a wedge stock.

20. A pneumatic tire having an outer circumferential tread where said tread is a sulfur-cured rubber composition which is comprised of at least one rubbery polymer and from about 1 to about 20 phr of uintahite, wherein the tread is free of crosslinked fatty acids.

21. A pneumatic tire as specified in claim 20 wherein the uintahite is virgin uintahite.

22. A pneumatic tire as specified in claim 21 wherein the uintahite is present as a level which is within the range of about 2 phr to about 15 phr.

23. A pneumatic tire as specified in claim 22 wherein the rubbery polymer is at least one polydiene rubber.

24. A pneumatic tire as specified in claim 23 wherein the uintahite is present at a level which is within the range of about 3 phr to about 10 phr.

25. A pneumatic tire as specified in claim 23 wherein the uintahite is present at a level which is within the range of about 4 phr to about 6 phr.

26. A pneumatic tire which is comprised of a generally toroidal-shaped carcass, an outer circumferential tread which is adapted to be ground contacting, two spaced beads and two sidewalls extending radially from said spaced beads and connecting said tread to said spaced beads, wherein said tread is comprised of (a) at least one rubbery polymer and (b) from about 1 phr to about 20 phr of uintahite, wherein said tread is free of crosslinked fatty acids.

27. A pneumatic tire as specified in claim 26 wherein the uintahite is virgin uintahite.

28. A pneumatic tire as specified in claim 27 wherein the uintahite is present at a level which is within the range of about 2 phr to about 15 phr.

29. A pneumatic tire as specified in claim 28 wherein the rubbery polymer is at least one polydiene rubber.

30. A sulfur-cured tire rubber composition as specified in claim 1 wherein said sulfur-cured tire rubber composition is in the form of a coverstrip.

31. A sulfur-cured tire rubber composition as specified in claim 1 wherein said sulfur-cured tire rubber composition is in the form of an overlay.

32. A sulfur-cured tire rubber composition as specified in claim 1 wherein said sulfur-cured tire rubber composition is free of starch.

33. A sulfur-cured tire rubber composition which is comprised of at least one rubbery polymer and from about 1 phr to about 20 phr of uintahite, wherein the sulfur-cured tire rubber composition is free of starch.

34. A sulfur-cured tire rubber composition as specified in claim 33 wherein the uintahite is virgin uintahite.

35. A sulfur-cured tire rubber composition as specified in claim 34 wherein the rubbery polymer is one or more polydiene rubbers.

36. A sulfur-cured tire rubber composition as specified in claim 35 wherein the uintahite is present at a level which is within the range of about 2 phr to about 15 phr.

37. A sulfur-cured tire rubber composition as specified in claim 35 wherein the uintahite is present at a level which is within the range of about 3 phr to about 10 phr.

38. A sulfur-cured tire rubber composition as specified in claim 35 wherein the uintahite is present at a level which is within the range of about 4 phr to about 6 phr.

39. A sulfur-cured tire rubber composition as specified in claim 33 wherein the uintahite is hydrocarbon solvent extracted uintahite.

40. A sulfur cured tire rubber composition as specified in claim 39 wherein the rubbery polymer is one or more polydiene rubbers.

41. A sulfur-cured tire rubber composition as specified in claim 40 wherein the uintahite is present at a level which is within the range of about 2 phr to about 15 phr.

42. A sulfur-cured tire rubber composition as specified in claim 41 wherein polybutadiene rubber and styrene-butadiene rubber are present as polydiene rubbers.

43. A sulfur-cured tire rubber composition as specified in claim 33 wherein said sulfur-cured tire rubber composition is in the form of a sidewall.

44. A sulfur-cured tire rubber composition as specified in claim 33 wherein said sulfur-cured tire rubber composition is in the form of an apex.

45. A sulfur-cured tire rubber composition as specified in claim 33 wherein said sulfur-cured tire rubber composition is in the form of a chafer.

46. A sulfur-cured tire rubber composition as specified in claim 33 wherein said sulfur-cured tire rubber composition is in the form of a bead coat.

47. A sulfur-cured tire rubber composition as specified in claim 33 wherein said sulfur-cured tire rubber composition is in the form of a toeguard.

48. A sulfur-cured tire rubber composition as specified in claim 33 wherein said sulfur-cured tire rubber composition is in the form of an innerliner.

49. A sulfur-cured tire rubber composition as specified in claim 33 wherein said sulfur-cured tire rubber composition is in the form of a ply coat.

50. A sulfur-cured tire rubber composition as specified in claim 33 wherein said sulfur-cured tire rubber composition is in the form of a gum strip.

51. A sulfur-cured tire rubber composition as specified in claim 33 wherein said sulfur-cured tire rubber composition is in the form of a wedge stock.

52. A pneumatic tire having an outer circumferential tread where said tread is a sulfur-cured rubber composition which is comprised of at least one rubbery polymer and from about 1 to about 20 phr of uintahite, wherein the tread is free of starch.

53. A pneumatic tire as specified in claim 52 wherein the uintahite is virgin uintahite.

54. A pneumatic tire as specified in claim 53 wherein the uintahite is present as a level which is within the range of about 2 phr to about 15 phr.

55. A pneumatic tire as specified in claim 54 wherein the rubbery polymer is at least one polydiene rubber.

56. A pneumatic tire as specified in claim 55 wherein the uintahite is present at a level which is within the range of about 3 phr to about 10 phr.

57. A pneumatic tire as specified in claim 55 wherein the uintahite is present at a level which is within the range of about 4 phr to about 6 phr.

58. A pneumatic tire which is comprised of a generally toroidal-shaped carcass, an outer circumferential tread which is adapted to be ground contacting, two spaced beads and two sidewalls extending radially from said spaced beads and connecting said tread to said spaced beads, wherein said tread is comprised of (a) at least one rubbery polymer and (b) from about 1 phr to about 20 phr of uintahite, wherein said tread is free of starch.

59. A pneumatic tire as specified in claim 58 wherein the uintahite is virgin uintahite.

60. A pneumatic tire as specified in claim 59 wherein the uintahite is present at a level which is within the range of about 2 phr to about 15 phr.

61. A pneumatic tire as specified in claim 60 wherein the rubbery polymer is at least one polydiene rubber.

\* \* \* \* \*